(12) United States Patent
Yu et al.

(10) Patent No.: US 8,432,845 B2
(45) Date of Patent: *Apr. 30, 2013

(54) SEMI-PERSISTENT SCHEDULING AND DISCONTINUOUS RECEPTION ALIGNMENT

(75) Inventors: Yi Yu, Irving, TX (US); Zhijun Cai, Euless, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 3 days.

This patent is subject to a terminal disclaimer.

(21) Appl. No.: 13/244,833

(22) Filed: Sep. 26, 2011

(65) Prior Publication Data

US 2012/0014344 A1 Jan. 19, 2012

Related U.S. Application Data

(63) Continuation of application No. 12/637,461, filed on Dec. 14, 2009.

(60) Provisional application No. 61/122,481, filed on Dec. 15, 2008.

(51) Int. Cl.
*H04Q 7/00* (2006.01)

(52) U.S. Cl.
USPC .......................................... 370/311; 370/329

(58) Field of Classification Search .................. 370/311, 370/328–338; 455/450–453, 509–513
See application file for complete search history.

(56) References Cited

U.S. PATENT DOCUMENTS

| | | |
|---|---|---|
| 2008/0232284 A1 | 9/2008 | Dalsgaard et al. |
| 2008/0293426 A1 | 11/2008 | Kim et al. |
| 2009/0203376 A1 | 8/2009 | Sambhwani et al. |
| 2009/0207794 A1 | 8/2009 | Meylan |
| 2010/0040028 A1* | 2/2010 | Maheshwari et al. ........ 370/336 |
| 2010/0255850 A1 | 10/2010 | Kaukoranta et al. |
| 2011/0083066 A1 | 4/2011 | Chung et al. |
| 2011/0176513 A1* | 7/2011 | Yi et al. ........................ 370/331 |

FOREIGN PATENT DOCUMENTS

WO WO2007073118 A1 6/2007

OTHER PUBLICATIONS

3GPP TSG-RAN WG2 #63, Research in Motion, Ltd., "Reliability Analysis of UL SPS Activation Signalling", Aug. 2008.*
3GPP TS 36.213 V8.3.0 (May 2008); "3rd Generation Partnership Project; Technical Specification Group Radio Access Network; Evolved Universal Terrestrial Radio Access (E-UTRA); Physical Layer Procedures (Release 8)"; 3GPP Organizational Partners; May 2008; 45 pages.

(Continued)

*Primary Examiner* — Pao Sinkantarakorn
(74) *Attorney, Agent, or Firm* — Fish & Richardson P.C.

(57) ABSTRACT

A method is provided for detection of an uplink grant for a user agent (UA). The method comprises detecting a semi-persistent scheduling (SPS) activation/reconfiguration signaling over a physical downlink control channel (PDCCH) only during an SPS activation window, wherein the SPS activation window precedes a discontinuous reception (DRX) on-duration by a predetermined amount of time. Also included is a UA comprising a component configured to detect an SPS activation/reconfiguration signaling over a PDCCH only during an SPS activation window, wherein the SPS activation window precedes a DRX on-duration by a predetermined amount of time.

30 Claims, 5 Drawing Sheets

OTHER PUBLICATIONS

3GPP TS 36.321 V8.3.0 (Sep. 2008); 3rd Generation Partnership Project; Technical Specification Group Radio Access Network; Evolved Universal Terrestrial Radio Access (E-UTRA); Medium Access Control (MAC) Protocol Specification (Release 8); 3GPP Organizational Partners; Sep. 2008; 36 pages.
3GPP TS 36.300 v8.5.0;"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8"; May, 2008; 134 pages.
CATT; "Process ID Allocation for Downlink Persistent Scheduling"; R2-080719; Feb. 11, 2008; 5 pages.
Ericsson; "SR Triggering in Relation to Uplink for Grants"; TSG-RAN WG2 #61 bis; R2-081468; Shenzhen, China; Mar. 31-Apr. 4, 2008; 3 pages.
Ericsson; "Remaining Issues in Semi-Persistent Scheduling"; TSG-RAN WG2 Meeting #62; R2-082153; Kansas, US; May 5-9, 2008; 2 pages.
ETSI MCC; TSG-RAN Working Group 2 Meeting #63bis; "Report of 3GPP TSG RAN WG2 Meeting #63"; R2-085971; Prague, Czech Republic; Oct. 18-22, 2008; 156 pages.
Interdigital; "CQI Reporting and PDCCH Reception During DRX"; TSS RAN WG2 #63; R2-084080; Jeju, Korea; Aug. 18-22, 2008; 6 pages.
Nokia Corporation et al.; "Persistent Scheduling for DL"; TSG-RAN WG2 Meeting #62; R2-082302; R2-081542; Kansas City, USA; May 5-9, 2008; 6 pages.
Nokia Corporation; "Buffer Reporting for E-UTRAN"; TSG-RAN WG2 Meeting #52; R2-060829; Athens, Greece; Mar. 27-31, 2006; 5 pages.
Nortel; "HARQ Process ID's for DL Persistent Scheduling"; TSG RAN WG2 #60; R2-075153; Jeju, South Korea; Nov. 5-9, 2007; 5 pages.
NTT Docomo et al.; "Buffer Status Report and Scheduling Request Triggers"; TSG RAN WG2 #59bis; R2-074173; Shanghai, China; Oct. 8-12, 2007; 4 pages.
Qualcomm Europe; "BSR Triggers"; TSG-RAN WG2 #60bis; R2-080375; Sevilla, Spain; Jan. 14-18, 2007; 3 pages.
Research in Motion Limited; "Detection Time of SPS Activation/Reconfiguration Signaling"; TSG-RAN WG2 #63bis; R2-085438; Prague, Czech Republic; Sep. 29-Oct. 3, 2008; 2 pages.
Research in Moiton Limited; "Various Issues Regarding SR Channel Handling (UL Semi-Persistent Scheduling Request)"; TSG-RAN-WG2 Meeting #61; R2-080811; Sorrento, Italy; Feb. 11-15, 2008; 2 pages.
Research in Motion Limited; "Semi-Persistent Scheduling and DRX Control"; TSG-RAN-WG2 Meeting #59; R2-073245; Athens, Greece; Aug. 20-24, 2007; 5 pages.
Sunplus Mmobile Inc.; "Impact of Semi-Persistent Scheduling of DRW Active Time"; TSG-RAN WG2 Meeting #62bis; R2-083431; Warsaw, Poland; Jun. 30-Jul. 4, 2008; 4 pages.
3GPP TSG RAN WG2 #63bis; Agenda Proposal; R2-084940 Prague, Czech Republic; Sep. 23-Oct. 3, 2008; 8 pages.
Office Action issued in U.S. Appl. No. 12/562,973 on Nov. 7, 2011; 18 pages.
International Search Report and Written Opinion of the International Searching Authority issued in International Application No. PCT/US2009/067916 on Jul. 19, 2010; 11 pages.
International Preliminary Report on Patentability issued in International Application No. PCT/US2009/067916 on Jun. 30, 2011; 9 pages.
International Search Report and Written Opinion of the International Searching Authority issued in International Application No. PCT/US2009/057559 on Dec. 17, 2009; 13 pages.
International Preliminary Report on Patentability issued in International Application No. PCT/US2009/057559 on Jan. 31, 2011; 8 pages.
Office Action issued in U.S. Appl. No. 12/637,461 on Dec. 21, 2011; 14 page.
Office Action issued in Mexican Application No. MX/a/2011/006039 on Oct. 11, 2012; 4 pages.
Office Action issued in U.S. Appl. No. 12/637,461 on May 7, 2012; 14 page.
Advisory Action issued in U.S. Appl. No. 12/637,461 on May 31, 2012; 3 pages.
Office Action issued in U.S. Appl. No. 12/562,973 on Aug. 13, 2012; 15 pages.
Notice of Allowance issued in U.S. Appl. No. 12/637,461 on Sep. 4, 2012; 8 pages.
Office Action issued in Korean Application No. 10-2011-7016235 on Sep. 27, 2012; 11 pages.
Office Action issued in Japanese Application No. 2011-528013 on Feb. 7, 2013; 5 pages.

* cited by examiner

SEMI-PERSISTENT SCHEDULING AND DISCONTINUOUS RECEPTION ALIGNMENT

CROSS-REFERENCE TO RELATED APPLICATIONS

The present application is a continuation of U.S. patent application Ser. No. 12/637,461, filed on Dec. 14, 2009, which claims priority to U.S. Provisional Patent Application No. 61/122,481, filed Dec. 15, 2008, by Yi Yu, et al, entitled "Semi-Persistent Scheduling And Discontinuous Reception Alignment" (34505-US-PRV-4214-14100), the applications are incorporated by reference herein as if reproduced in its entirety.

BACKGROUND

As used herein, the terms "user agent" and "UA" can refer to wireless devices such as mobile telephones, personal digital assistants, handheld or laptop computers, and similar devices that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar wireless capabilities but that are not transportable, such as telephones, desktop computers, set-top boxes, or network nodes. When a UA is a network node, the network node could act on behalf of another function such as a wireless device and simulate or emulate the wireless device. For example, for some wireless devices, the IP (Internet Protocol) Multimedia Subsystem (IMS) Session Initiation Protocol (SIP) client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" will refer to any component, such as a traditional base station or an LTE eNB, that can provide a UA with access to other components in a telecommunications system.

For packet data, the signal that carries data between a UA and an access device can have a specific set of frequency, time, and coding parameters and other characteristics that might be specified by the access device. A connection between a UA and an access device that has a specific set of such characteristics can be referred to as a resource. An access device typically establishes a different resource for each UA with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
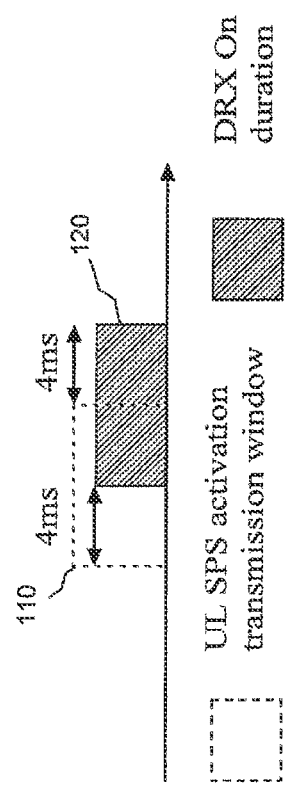
FIG. 1 is an illustration of an uplink semi-persistent scheduling activation window alignment with a discontinuous reception on-duration.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

During a voice session between a UA and an access device, talk spurts can alternate with silence periods. When a talk spurt ends and a silence period begins on the uplink, the UA typically stops transmitting in the uplink resource that the UA had been using. On the downlink, the UA typically stops receiving in the downlink resources that the UA has been assigned. When the UA stops transmitting in the uplink resource, the access device can then grant the resource to another UA. The releasing of the resource can be initiated by the UA or by the access device. When the silence period ends and a new talk spurt begins on the uplink, the UA may request that the access device grant the UA a new uplink resource on which to resume transmitting data packets. On the downlink, the access device grants the UA a new downlink resource on which to resume receiving data packets.

In a procedure known as semi-persistent scheduling (SPS) or configured scheduling, a resource for a data packet is granted and then substantially the same resource is repeatedly used for subsequent data packets. That is, in semi-persistent scheduling, the resource that an access device provides for data packets on an uplink or downlink is allocated at various intervals based on a grant and/or a single scheduling request. An original grant of an SPS resource can be referred to as SPS activation. If, at a subsequent time, an access device needs to reallocate an SPS resource with different parameters, the subsequent grant can be referred to as SPS reconfiguration.

An access device typically grants an uplink or downlink resource to a UA by sending SPS activation (or reconfiguration) signaling to the UA over the physical downlink control channel (PDCCH). The period of time during which the UA listens on the PDCCH and attempts to decode data received on the PDCCH can be referred to as the active time (TS 36.321). The SPS activation/reconfiguration signaling might be only a portion of the data that the UA typically listens for and attempts to decode during the active time. When a UA is not in the active time, the UA may not receive the data from the access device.

A period of time known as a discontinuous reception (DRX) on-duration can be defined as a periodic duration during which the UA wakes up for the purpose of monitoring the PDCCH. The length of DRX on-duration is controlled by an on-duration timer. A DRX cycle is a periodic repetition of the DRX on-duration followed by a possible period of inactivity (i.e., a DRX off-duration). The DRX cycle might be defined to last for a plurality of transmission time intervals (TTIs), such as milliseconds, and the DRX on-duration might be defined to be a portion of the DRX cycle. If no other activity is going on, the UA will wake up periodically to monitor the PDCCH for that portion of the DRX cycle and then sleep for the remaining portion of the DRX cycle. During the DRX on-duration, the UA may be allocated the SPS uplink resource.

For instance, for an uplink assignment, the UE may detect and decode (or process) the transmitted SPS activation/reconfiguration signaling over the PDCCH within a time window, referred to herein as an SPS activation window, which may at least partially overlap with the DRX on-duration. The SPS activation/reconfiguration signaling is detected and decoded before the actual uplink transmission using the activated or reconfigured uplink resource. Typically, there is some amount of time or time delay, which may be, for example, equal to about four TTIs or milliseconds, between the sending of the SPS activation/reconfiguration signaling and the uplink transmission. Accordingly, the SPS activation window may require proper alignment to ensure the allocation of the SPS uplink grant during the DRX on-duration. A portion of the SPS activation window may precede the DRX on-duration by the time delay for detecting and decoding the SPS activation/reconfiguration signaling. As such, the start of the SPS activation window may precede the start of the DRX on-duration. In one embodiment, the end of the SPS activation window may precede the end of the DRX on-duration by the same time delay as between the start of the SPS activation window and the start of the DRX on-duration. Hence, the SPS activation/reconfiguration signaling may be detected and decoded to allow the uplink grant to be allocated within the DRX on-duration.

Further, the PDCCH can include a cell radio network temporary identifier (CRNTI), an SPS RNTI, or a similar identifier, that specifies the UA for which the uplink resource is granted. A UA typically monitors or decodes the PDCCH payloads throughout the active time to determine if one of the PDCCH payloads contains an identifier addressed to that UA. As used herein, the term "payload" might refer to any formatted message. When the UA decodes a PDCCH payload with the UA's identifier, the UA knows that the resource allocation provided in the PDCCH payload is intended for that UA. In some cases, a UA might receive an identifier that was not addressed to that UA but that the UA mistakenly identifies as pertaining to itself. The UA might then attempt to transmit data on a resource that the UA mistakenly assumes was allocated to it. Such a false alarm or false detection can waste the UA's computing capacity and battery power, and also cause additional uplink interference.

In an embodiment, the frequency or rate of such false alarms may be reduced or limited by limiting the length of the SPS activation window. For instance, the SPS activation window may be about equal to the DRX on-duration. Accordingly, the uplink grant allocation time may be limited between the start of the DRX on-duration and the end of the DRX on-duration. In some embodiments, the UA may stop attempting to detect and process the SPS activation/reconfiguration signaling when the uplink resource allocated to the UA is released. In some embodiments, the UA might begin attempting to detect and process the SPS activation/reconfiguration signaling only after sending the access device a message requesting that the access device grant an uplink resource to the UA.

FIG. 1 illustrates an embodiment of an uplink SPS activation window alignment with a DRX on-duration. As shown in the figure, the length of the SPS activation window 110 may be about equal to the length of the DRX on-duration 120. In one embodiment, the length of the SPS activation window 110 and similarly the length of the DRX on-duration 120 may be equal to about eight TTIs or eight milliseconds. Further, the start of the SPS activation window may be aligned to precede the beginning of the DRX on-duration by a sufficient amount of time for the UA to detect and decode the SPS activation/reconfiguration signaling, and hence to allow the UA a remaining time to transmit using the allocated uplink grant within the DRX on-duration. For instance, the SPS activation/reconfiguration signaling may be aligned at about four TTIs or four milliseconds before the on duration to introduce a time delay that may be necessary for detecting and decoding the SPS activation/reconfiguration signaling. Accordingly, the SPS activation/reconfiguration signaling may begin and end at about four milliseconds before the DRX on-duration. Thus, the actual allocation of the uplink grant occurs during the DRX on-duration. One skilled in the art will appreciate that the time delay is system specific and the numbers provided herein are for example only.

Figure 2:
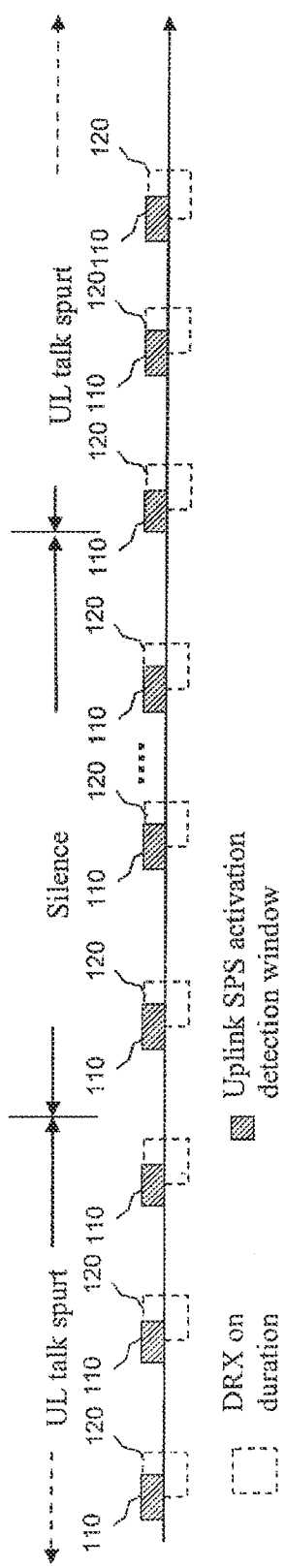
FIG. 2 is an illustration of a plurality of uplink semi-persistent scheduling activation/reconfiguration signaling detection times.

FIG. 2 illustrates an embodiment of a plurality of uplink SPS activation/reconfiguration signaling detection times. In an embodiment, when DRX is implemented, an access device may transmit, over the PDCCH, the uplink SPS activation/reconfiguration signaling within an SPS activation window 110 preceding each DRX on-duration 120 by about the same amount of time (e.g. four TTIs). This is typically done at the beginning of a talk spurt for activation or during a talk spurt for reconfiguration. Since the access device transmits the SPS activation/reconfiguration signaling during the SPS activation window 110, it is not necessary for the UA to try to detect SPS activation/reconfiguration signaling outside of the SPS activation window 110. By limiting the detection time for SPS activation/reconfiguration signaling to only the SPS activation window 110, the false alarm probability for SPS activation may be reduced. Otherwise, if the UA detects the SPS activation/reconfiguration signal without time limitation or during a longer time window, the UA may mistakenly identify more resources as being allocated and use such resources to transmit data. Consequently, the amount of false alarms can increase and the UA can waste battery power. Furthermore, this false detection of the SPS allocation would cause additional interference in the system.

Figure 3:
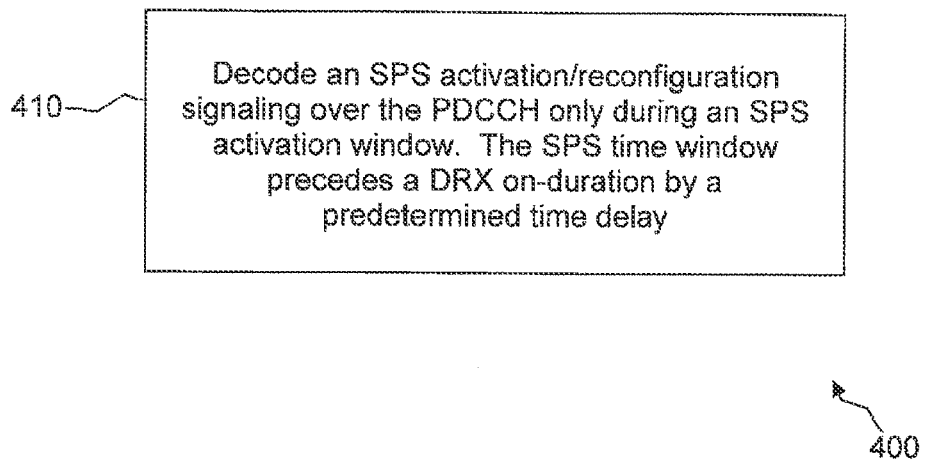
FIG. 3 is a diagram of a method for improving reliability in semi-persistent scheduling activation/reactivation according to an embodiment of the disclosure.

FIG. 3 illustrates an embodiment of a method 400 for improving reliability in the detection of an identifier for a UA during an uplink activation procedure. At block 410, the UA attempts to decode the uplink SPS activation/reconfiguration signaling only during an SPS activation window. In this embodiment, the start of the SPS activation window may precede the start of the DRX on-duration by a predetermined time delay, such as four milliseconds (or TTIs). In some cases, the UA might stop attempting to decode the uplink SPS activation/reconfiguration signaling when the resource that the UA is using to communicate with an access device is released. In some cases, the UA might have begun attempting to decode the uplink SPS activation/reconfiguration signaling when the UA sent the access device a buffer status report or a voice packet.

Figure 4:
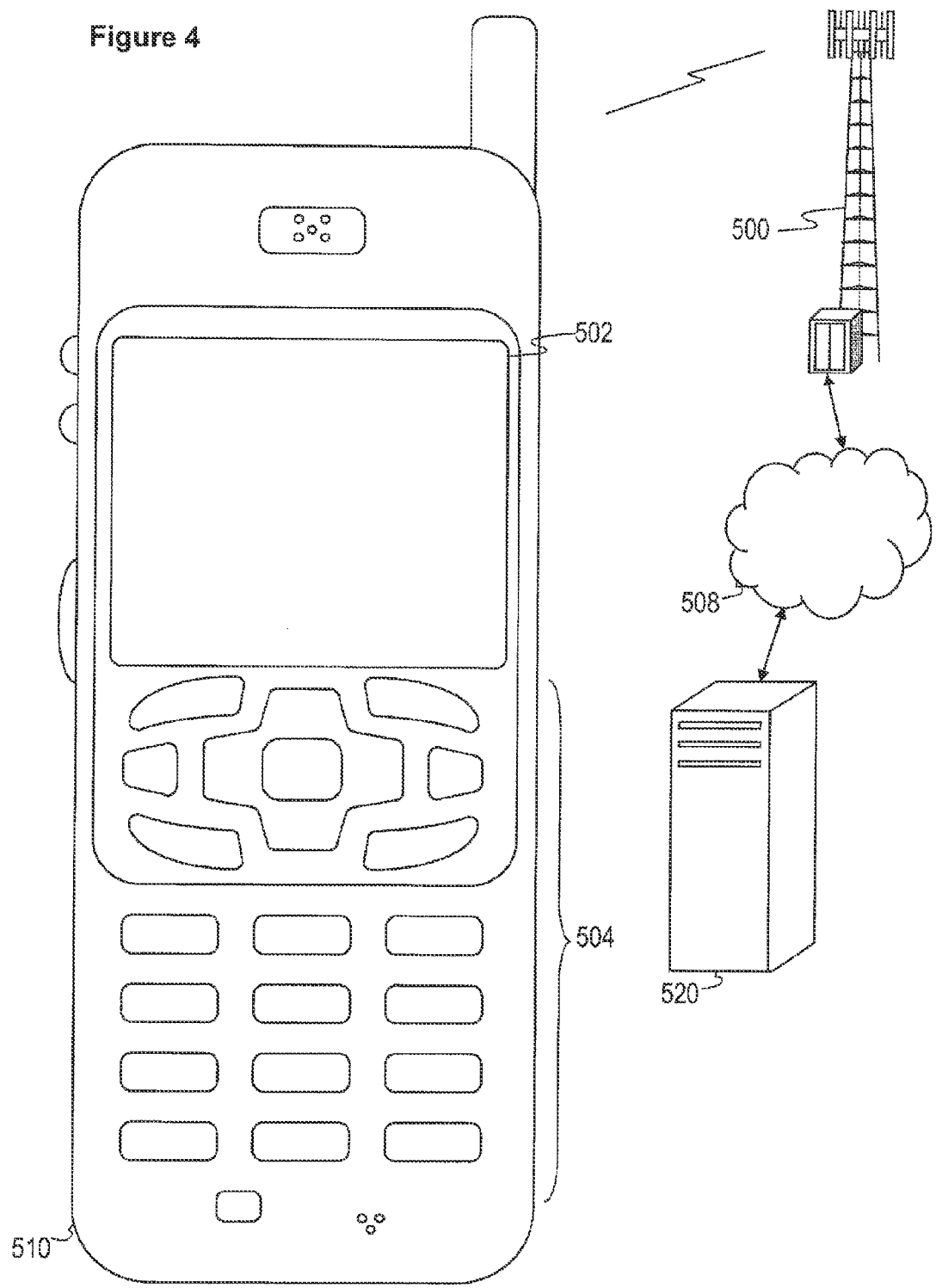
FIG. 4 is a diagram of a wireless communications system including a user agent operable for some of the various embodiments of the disclosure.

FIG. 4 illustrates a wireless communications system including an embodiment of a UA 510. The UA 510 is operable for implementing aspects of the disclosure, but the disclosure should not be limited to these implementations. Though illustrated as a mobile phone, the UA 510 may take various forms including a wireless handset, a pager, a personal digital assistant (PDA), a portable computer, a tablet computer, or a laptop computer. Many suitable devices combine some or all of these functions. In some embodiments of the disclosure, the UA 510 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UA 510 may be a portable, laptop or other computing device. The UA 510 may also be a device, include a device, or be included in a device that has similar capabilities but that is not transportable, such as a fixed line telephone, a desktop computer, a set-top box, or a network node. The UA 510 may support specialized activities such as gaming, inventory control, job control, and/or task management functions, and so on.

The UA 510 includes a display 502. The UA 510 also includes a touch-sensitive surface, a keyboard or other input keys generally referred as 504 for input by a user. Among the various applications executable by the UA 510 are a web browser, which enables the display 502 to show a web page. The web page may be obtained via wireless communications with a wireless network access node, a cell tower, a peer UA 510, or any other wireless communication network or system 500. The network 500 is coupled to a wired network 508, such as the Internet. Via the wireless link and the wired network, the UA 510 has access to information on various servers, such as a server 520. The server 520 may provide content that may be shown on the display 502. Alternately, the UA 510 may access the network 500 through a peer UA 510 acting as an intermediary, in a relay type or hop type of connection.

Figure 5:
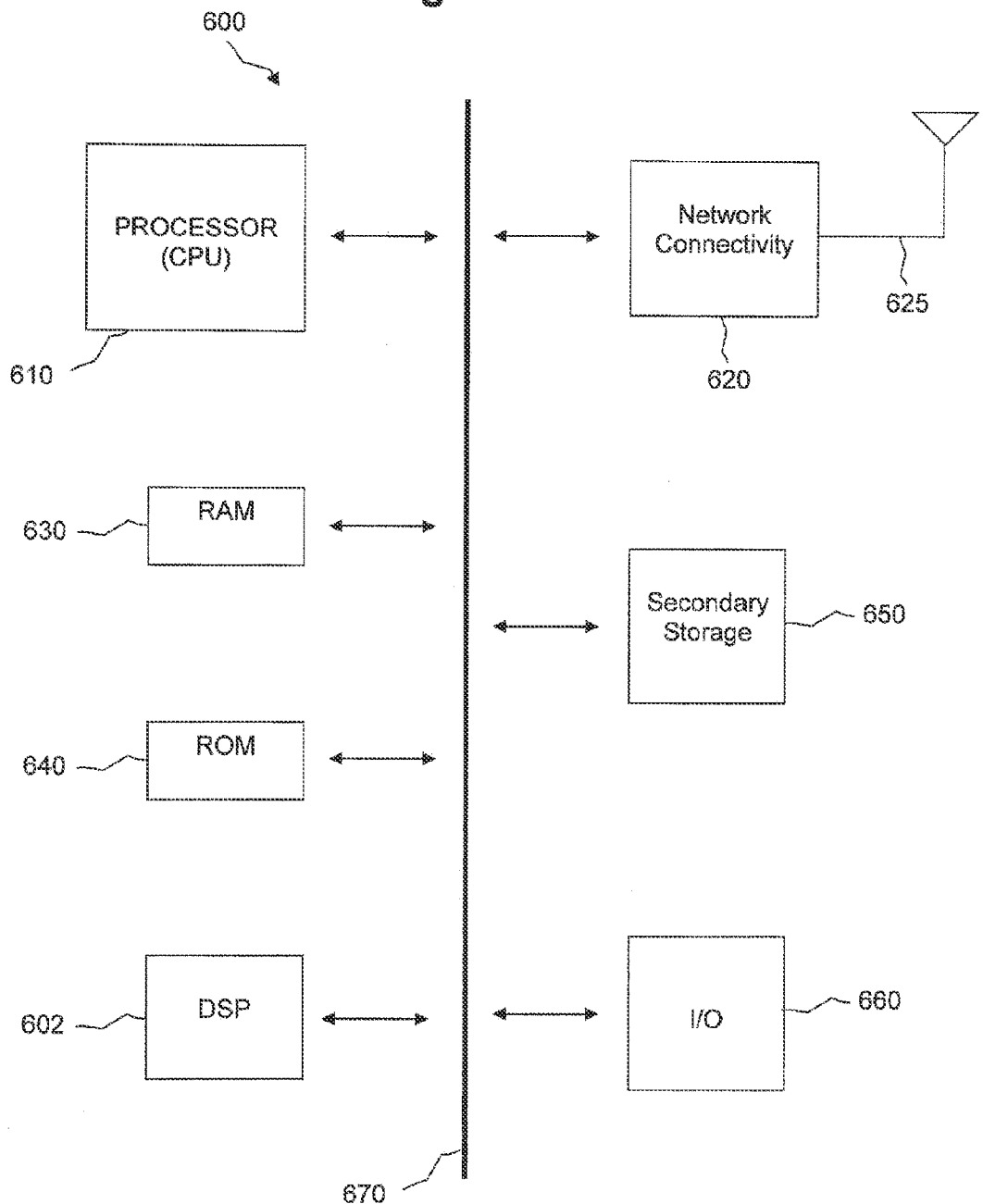
FIG. 5 is an illustrative general purpose computer system suitable for some of the various embodiments of the disclosure.

The UA 510 and other components described above might include a processing component that is capable of executing instructions related to the actions described above. FIG. 5 illustrates an example of a system 600 that includes a processing component 610 suitable for implementing one or more embodiments disclosed herein. In addition to the processor 610 (which may be referred to as a central processor unit or CPU), the system 600 might include network connectivity devices 620, random access memory (RAM) 630, read only memory (ROM) 640, secondary storage 650, and input/output (I/O) devices 660. These components might communicate with one another via a bus 670. In some cases, some of these components may not be present or may be combined in various combinations with one another or with other components not shown. These components might be located in a single physical entity or in more than one physical entity. Any actions described herein as being taken by the processor 610 might be taken by the processor 610 alone or by the processor 610 in conjunction with one or more components shown or not shown in the drawing, such as a digital signal processor (DSP).

The processor 610 executes instructions, codes, computer programs, or scripts that it might access from the network connectivity devices 620, RAM 630, ROM 640, or secondary storage 650 (which might include various disk-based systems such as hard disk, floppy disk, or optical disk). While only one CPU 610 is shown, multiple processors may be present. Thus, while instructions may be discussed as being executed by a processor, the instructions may be executed simultaneously, serially, or otherwise by one or multiple processors. The processor 610 may be implemented as one or more CPU chips.

The network connectivity devices 620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 620 may enable the processor 610 to communicate with the Internet or one or more telecommunications networks or other networks from which the processor 610 might receive information or to which the processor 610 might output information. The network connectivity devices 620 might also include one or more transceiver components 625 capable of transmitting and/or receiving data wirelessly.

The RAM 630 might be used to store volatile data and perhaps to store instructions that are executed by the processor 610. The ROM 640 is a non-volatile memory device that typically has a smaller memory capacity than the memory capacity of the secondary storage 650. ROM 640 might be used to store instructions and perhaps data that are read during execution of the instructions. Access to both RAM 630 and ROM 640 is typically faster than to secondary storage 650. The secondary storage 650 is typically comprised of one or more disk drives or tape drives and might be used for non-volatile storage of data or as an over-flow data storage device if RAM 630 is not large enough to hold all working data. Secondary storage 650 may be used to store programs that are loaded into RAM 630 when such programs are selected for execution.

The I/O devices 660 may include liquid crystal displays (LCDs), touch screen displays, keyboards, keypads, switches, dials, mice, track balls, voice recognizers, card readers, paper tape readers, printers, video monitors, or other well-known input or output devices. Also, the transceiver 625 might be considered to be a component of the I/O devices 660 instead of or in addition to being a component of the network connectivity devices 620. Some or all of the I/O devices 660 may be substantially similar to various components depicted in the previously described drawing of the UA 510, such as the display 502 and the input 504.

The following 3rd Generation Partnership Project (3GPP) Technical Specification (TS) is incorporated herein by reference: TS 36.321.

According to one embodiment, a method for detection of an uplink grant for a UA. The method comprises detecting an SPS activation/reconfiguration signaling over a PDCCH only during an SPS activation window, wherein the SPS activation window precedes a DRX on-duration by a predetermined amount of time.

In another embodiment, a method is provided for detection of an uplink grant for a UA. The method comprises transmitting an SPS activation/reconfiguration signaling over a PDCCH only during an SPS activation window, wherein the SPS activation window precedes a DRX on-duration by a predetermined amount of time.

In another embodiment, a user agent is provided. The user agent comprises a component configured to detect an SPS activation/reconfiguration signaling over a PDCCH only during an SPS activation window, wherein the SPS activation window precedes a DRX on-duration by a predetermined amount of time.

In another embodiment, an access equipment is provided. The access equipment comprises a component configured to transmit an SPS activation/reconfiguration signaling over a PDCCH only during an SPS activation window, wherein the SPS activation window precedes a DRX on-duration by a predetermined amount of time.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method in a user equipment that operates in accordance with a configured discontinuous reception (DRX) cycle in which the user equipment monitors a physical downlink control channel (PDCCH) during at least a defined DRX on-duration of the configured DRX cycle, the method comprising:
   sending to an access device a request for an uplink transmission resource; and
   monitoring the PDCCH for semi-persistent scheduling (SPS) activation signaling associated with a grant of an SPS resource after sending the request, wherein said monitoring occurs during a time period that at least partially precedes a start of the defined DRX on-duration.

2. The method of claim 1, wherein said monitoring the PDCCH for SPS activation signaling occurs prior to the start of the defined DRX on-duration regardless of the configured DRX cycle.

3. The method of claim 1, wherein the operation of sending the request for the uplink transmission resource occurs prior to the start of the defined DRX on-duration.

4. The method of claim 1, further comprising refraining from monitoring the PDCCH for SPS activation signaling until after the request is transmitted.

5. The method of claim 1, wherein sending the request includes transmitting a message to the access device requesting the uplink transmission resource prior to the start of the defined DRX on-duration of the configured DRX cycle.

6. The method of claim 5, wherein the request for the uplink transmission resource occurs as a result of a talk spurt after a silence period in a voice session.

7. The method of claim 1, wherein said monitoring includes detecting and decoding SPS activation signaling received via the PDCCH.

8. The method of claim 7, wherein detecting and decoding occurs only during an SPS activation window, the SPS activation window that at least partially precedes the start of the defined DRX on-duration.

9. The method of claim 8, wherein the SPS activation window precedes the start of the defined DRX on-duration by a predetermined amount of time.

10. The method of claim 8, wherein the SPS activation window is limited to a predetermined duration that is associated with the defined DRX on-duration.

11. The method of claim 8, wherein the SPS activation window ends when the uplink transmission resource is released.

12. A user equipment (UE) that operates in accordance with a configured discontinuous reception (DRX) cycle in which the user equipment monitors a physical downlink control channel (PDCCH) during a defined DRX on-duration of the configured DRX cycle, the user equipment comprising:
    a processor configured to send to an access device a request for an uplink transmission resource; and
    the processor further configured to monitor the PDCCH for semi-persistent scheduling (SPS) activation signaling associated with a grant of an SPS resource after sending the request and during a time period that at least partially precedes a start of the defined DRX on-duration.

13. The user equipment of claim 12, wherein the processor is configured to monitor the PDCCH for SPS activation signaling prior to the start of the defined DRX on-duration regardless of the configured DRX cycle.

14. The user equipment of claim 12, wherein the processor is configured to send the request for the uplink transmission resource occurs prior to the start of the defined DRX on-duration.

15. The user equipment of claim 12, wherein the processor is further configured to refrain from monitoring the PDCCH for SPS activation signaling until after the request is transmitted.

16. The user equipment of claim 12, wherein the processor being configured to send the request includes the processor configured to transmit a message to the access device requesting the uplink transmission resource prior to the start of the defined DRX on-duration of the configured DRX cycle.

17. The user equipment of claim 16, wherein the request for the uplink transmission resource occurs as a result of a talk spurt after a silence period in a voice session.

18. The user equipment of claim 12, wherein the processor configured to monitor includes the processor being configured to detect and decode SPS activation signaling received via the PDCCH.

19. The user equipment of claim 18, wherein the processor is configured to detect and decode only during an SPS activation window, the SPS activation window that at least partially precedes the start of the defined DRX on-duration.

20. The user equipment of claim 19, wherein the SPS activation window precedes the start of the defined DRX on-duration by a predetermined amount of time.

21. The user equipment of claim 19, wherein the SPS activation window is limited to a predetermined duration that is associated with the defined DRX on-duration.

22. A non-transitory computer-readable medium having computer executable instructions stored thereon for implementing a method in a user equipment that operates in accordance with a configured discontinuous reception (DRX) cycle in which the user equipment monitors a physical downlink control channel (PDCCH) during at least a defined DRX on-duration of the configured DRX cycle, the instructions comprising:

sending to an access device a request for an uplink transmission resource; and monitoring the PDCCH for semi-persistent scheduling (SPS) activation signaling associated with a grant of an SPS resource after sending the request, wherein said monitoring occurs during a time period that at least partially precedes a start of the defined DRX on-duration.

23. The computer-readable medium of claim 22, wherein said monitoring the PDCCH for SPS activation signaling occurs prior to the start of the defined DRX on-duration regardless of the configured DRX cycle.

24. The computer-readable medium of claim 22, wherein the operation of sending the request for the uplink transmission resource occurs prior to the start of the defined DRX on-duration.

25. The computer-readable medium of claim 22, further comprising refraining from monitoring the PDCCH for SPS activation signaling until after the request is transmitted.

26. The computer-readable medium of claim 22, wherein sending the request includes transmitting a message to the access device requesting the uplink transmission resource prior to the start of the defined DRX on-duration of the configured DRX cycle.

27. The computer-readable medium of claim 26, wherein the request for the uplink transmission resource occurs as a result of a talk spurt after a silence period in a voice session.

28. The computer-readable medium of claim 22, wherein said monitoring includes detecting and decoding SPS activation signaling received via the PDCCH.

29. The computer-readable medium of claim 28, wherein detecting and decoding occurs only during an SPS activation window, the SPS activation window that at least partially precedes the start of the defined DRX on-duration.

30. The computer-readable medium of claim 29, wherein the SPS activation window precedes the start of the defined DRX on-duration by a predetermined amount of time.

* * * * *